Oct. 6, 1936.     R. A. BRADLEY ET AL     2,056,820
TANK VEHICLE
Filed May 9, 1934     2 Sheets-Sheet 1
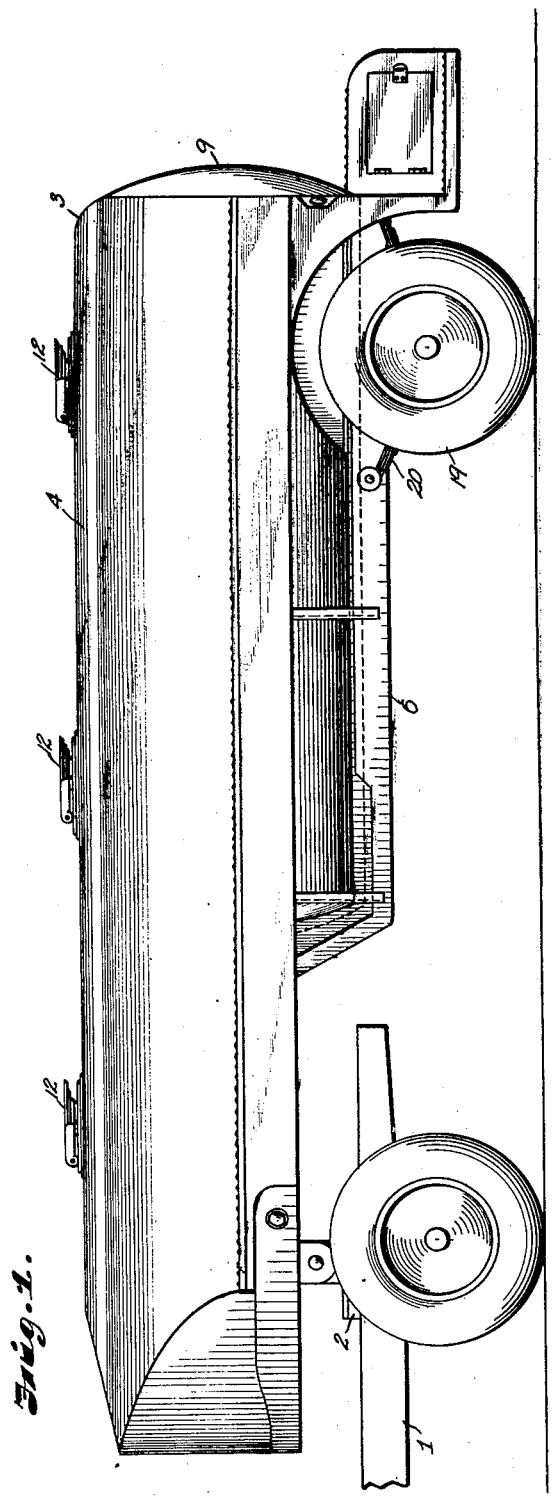
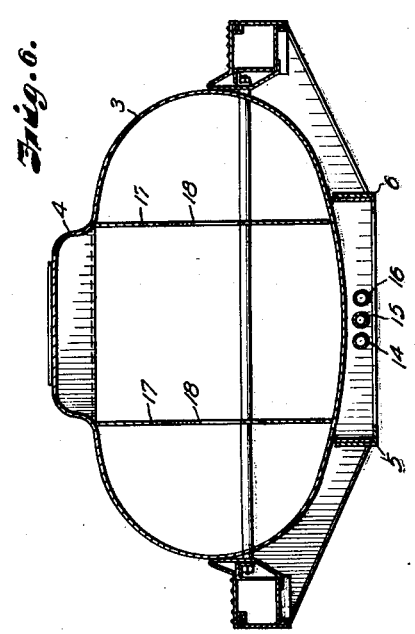
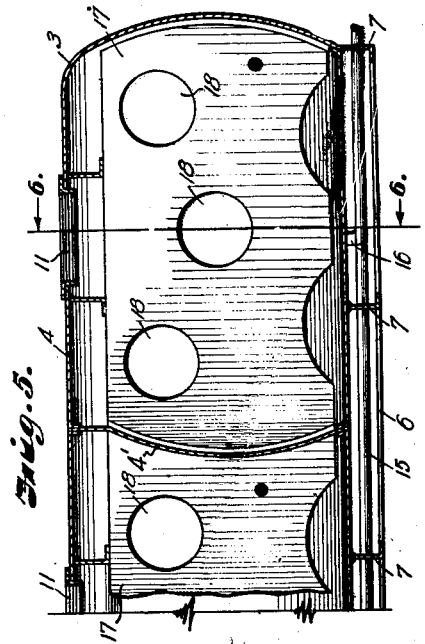
INVENTOR
Ralph A. Bradley,
Emanuel E. Norquist
and Victor C. Norquist
By Thos. E. Scofield
ATTORNEY

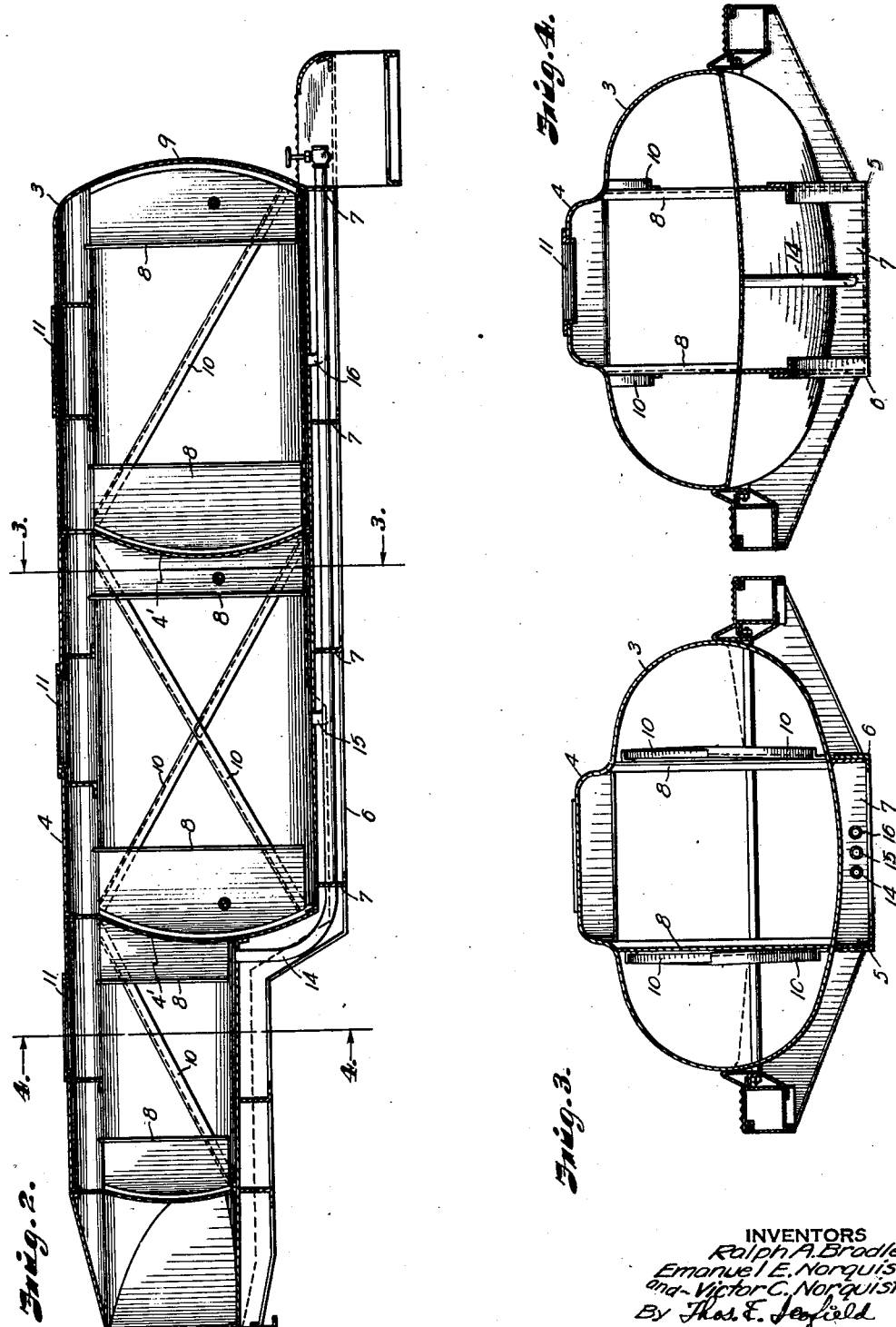

Patented Oct. 6, 1936

2,056,820

UNITED STATES PATENT OFFICE 2,056,820

TANK VEHICLE

Ralph A. Bradley, Emanuel E. Norquist, and Victor C. Norquist, Kansas City, Mo., assignors to Butler Manufacturing Company, Kansas City, Mo., a corporation of Missouri Application May 9, 1934, Serial No. 724,752

4 Claims. (Cl. 220—1)

Our invention relates to tank vehicles and more particularly to a trailer vehicle adapted to transport liquids.

Currently, it has become increasingly popular practice to transport liquids such as gasoline, fuel oils, lubricating oils, milk, and the like, by motor transport. The laws of many States prohibit the passage of vehicles in excess of a certain designated weight or of a certain designated width over the roads of that State. In order to increase the useful load of the liquid being transported, it is desirable to make the tank vehicle of the lightest possible construction without sacrificing strength. In order to permit the load to be safely hauled, it is desirable that the vehicle have a low center of gravity.

One object of our invention is to provide a trailer tank vehicle of light but strong construction.

Another object of our invention is to provide a trailer tank vehicle having a low center of gravity.

Another object of our invention is to provide a trailer tank vehicle having a large capacity for its weight.

Other and further objects of our invention will appear from the following description.

In general, our invention contemplates the provision of a trailer vehicle having an offset forward end in order to provide a vehicle of a low center of gravity. In order to save weight, the chassis, which is customary in vehicles and upon which the tank is usually placed, is eliminated. In order to compensate for the elimination of the chassis, the tank itself is so formed and braced as to constitute it a beam adapted to withstand any stresses occasioned.

In the accompanying drawings, which form part of the instant specification and are to be read in conjunction therewith, and in which like reference numerals are used to indicate like parts in the various views;

Figure 1 is a side elevation of a trailer tank embodying one mode of carrying out our invention.

Figure 2 is a sectional view of the trailer tank chassis in Figure 1.

Figure 3 is a sectional view taken on a line 3—3 of Figure 2.

Figure 4 is a sectional view taken on a line 4—4 of Figure 2.

Figure 5 is a fragmentary sectional view of a trailer tank of modified form.

Figure 6 is a sectional view taken on a line 6—6 of Figure 5.

More particularly referring now to the drawings, the towing vehicle 1 is provided with a fifth wheel 2 upon which the forward offset end of the trailer vehicle is mounted. The tank 3 is made of any suitable sheet metal and is preferably of oval shape such as can be seen by reference to Figure 6. The tank 3 is divided into suitable compartments by means of partitions 4 as can readily be seen by reference to Figure 2. In order to provide increased stiffness of the tank shell 3 and to increase the ordinate from the neutral axis, we provide a longitudinally extending dome 4 along the top of the tank. The dome 4 is formed integral with and a continuation of the shell 3 as can readily be seen by reference to Figures 3 and 4. Welded to the exterior portion of the shell 3 we provide longitudinally extending beams 5 and 6. At suitable intervals we weld cross members 7 to the exterior shell 3 of the tank, as can readily be seen by reference to Figures 2 and 3. To take the bending moment and to reinforce the shell itself, we provide internal bracing means comprising a pair of bracing structures disposed on each side of the longitudinal axis. Referring to Figure 2, vertical plates 8 are welded to the interior of the tank surface and to partitions 4'. The plate 8 is welded to the end wall 9 of the tank shell 3. Bracing members 10 are then welded to the plates 8 in the manner shown in Figure 2 forming a truss-like structure. Suitable manholes 11 are provided for the respective compartments provided with manhole covers 12. Pipes 14, 15, and 16, equipped with suitable valves are provided for draining liquids from the respective compartments.

In the modification shown in Figures 5 and 6, plates 17 extend from partition to partition instead of using the bracing members 10 in the form shown in Figure 2. This construction is heavier than the preferred form, but may be used in small vehicles where the question of maximum capacity is not so critical. The plates 17 may be fitted with lightening holes 18. The structure formed in the manner described, it will readily be appreciated, is a unitary beam which is at once a tank and a chassis. It may be directly mounted upon the fifth wheel 2 and ground wheels 19 through the agency of suitable mounting means such as springs 20.

It will be observed that we have accomplished the objects of our invention. We have provided a tank trailer vehicle of rigid construction and of sufficient strength to carry liquids without the aid of a chassis. Our construction has a low center of gravity and a large capacity per unit of weight.

It will be readily observed that, by running the dome the full length of the tank that the proper size dome is automatically provided when partitions are placed within the tank at any desired points. The greater the space between the partitions, the greater the dome embraced therebetween, so that proper expansion space is provided.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a vehicle tank having a tank, internal and external bracing means therefor, a tank formed with an integral dome at the upper portion thereof, said dome extending longitudinally and substantially throughout the length of said tank to act as a stiffening member, and forming an expansion chamber for liquid within said tank.

2. A tank vehicle as in claim 1 in which said tank is formed with a reduced end portion.

3. A tank divided into compartments and adapted to be mounted on a tank vehicle, said tank having a longitudinal dome extending substantially the entire length thereof and formed integrally therewith to act as a stiffening member, said dome furnishing an expansion space for the compartments of the tank.

4. In a tank for a tank vehicle, a shell formed with an integral dome extending longitudinally of said shell for substantially the entire length thereof, said dome forming a vapor space for liquid within said tank and acting as a stiffening means for said shell.

RALPH A. BRADLEY.
EMANUEL E. NORQUIST.
VICTOR C. NORQUIST.